United States Patent Office

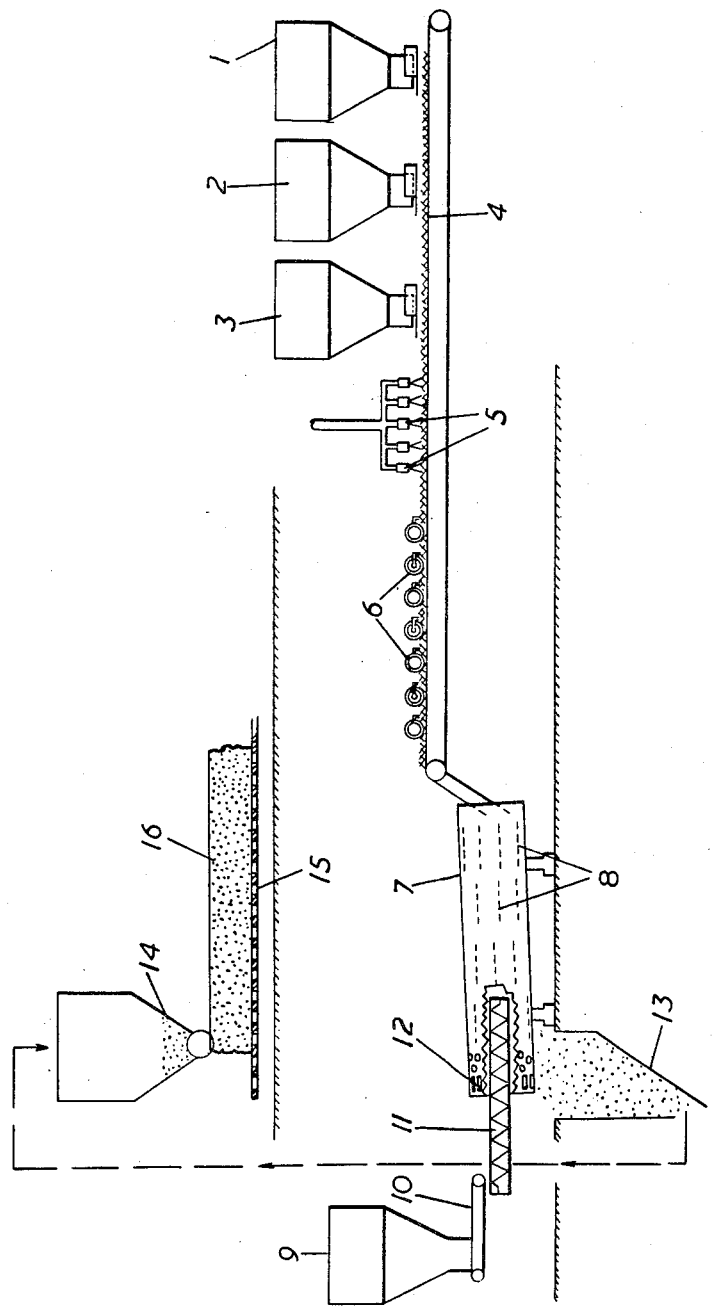

2,914,395
Patented Nov. 24, 1959

2,914,395

PREPARATION OF MATERIAL FOR SINTERING

William Davies, Rotherham, England, assignor to The United Steel Companies Limited, Sheffield, England Application October 15, 1956, Serial No. 616,075

Claims priority, application Great Britain October 31, 1955

4 Claims. (Cl. 75—5)

This invention relates to the sintering of ores, metalliferous residues and concentrates on sintering grates. In such processes the material to be sintered is formed into a gas-permeable bed on the grate and air is drawn through the bed either upwards or downwards. The bed must contain combustible matter, and unless the material to be sintered is pyrites or other material which will itself burn exothermically in air fuel such as coke breeze is added.

The material to be sintered is generally a mixture of two or more constituents, e.g. a concentrate and fines, or two different concentrates, but it may be a single material with or without fuel.

Whatever the number of constituents it is highly desirable that the material should present an agglomerate structure on the grate, i.e. the particles of material should adhere to one another and form small agglomerates. Such a structure has good permeability and in consequence the air necessary in the sintering process may be drawn through the bed more readily and with less expenditure of power, and the loss of fine particles through the grate bars is reduced.

To produce the agglomerate structure the material or its constituents are passed through a mixer, which is usually a rotary drum fitted with lifters, and the particles are caused to tumble over one another. Moisture must always be present, and if the material does not naturally include enough moisture water is added. The amount of this moisture is critical, but naturally varies with the material. It must be enough to enable the particles to adhere to form agglomerate but not be so much that the surface of the agglomerates is wet and sticky, since wet and sticky agglomerates are weak and tend to collapse under their own weight, so destroying the gas-permeability. Moreover the period during which the material remains in the mixer must not be so long that after the agglomerates have been formed they roll over one another and in so doing cause moisture to be pressed out of the interior of each agglomerate to its surface. The conditions necessary for the production of a satisfactory agglomerate structure in any given material are readily found in practice.

When the agglomerate structure has been formed into a bed on a sintering grate and this bed has been ignited, combustion does not proceed simultaneously throughout the whole depth of the bed. On the contrary, combustion at any instant is limited to a nearly horizontal zone generally less than one inch thick in a bed, say, 10 to 20 inches deep. In this zone the agglomerate structure is destroyed, being replaced by a sponge-like mass, the change taking place in the course of a few seconds by local fusion of the bed. In down-draught practice this zone is overlain by finished sinter and rests on unburnt material; in up-draught sintering the finished sinter and unburnt material are in the reverse position.

It is commonly observed that soon after combustion is established in the bed the permeability of the unburnt part of the bed decreases to a value much below that obtaining before ignition is initiated and that this low value is maintained until combustion approaches completion. This loss of permeability has been attributed to a variety of causes. However, I have found that it is due primarily to the evaporation of water from the unburnt material in, and close to, the combustion zone. This water is carried in the waste gas drawn away from the combustion zone. The waste gas is cooled by the unburnt material and much of its water content condenses there, the condensed water partially choking the pores in the bed. This condensed water is partly absorbed by the unburnt material, so increasing the moisture content locally, with the result that the agglomerate structure of the bed is weakened and the bed may collapse with consequent loss of permeability. This tendency of the bed to collapse is most noticeable in down-draught sintering as collapse is accentuated by the suction as well as by the weight of the overlying material.

The phenomena above described limit the permeability of the bed throughout the greater part of the sintering process, and to that extent determine the rate at which combustion proceeds.

It is an object of the invention to decrease the tendency to collapse of a permeable bed on a sintering grate.

It is another object of the invention so to treat agglomerates to be formed into a permeable bed that the time required for sintering is reduced.

A further object of the invention is to provide an improved agglomerate structure in materials to be sintered.

According to this invention a small amount of powdered lime or magnesia or both is added to an agglomerate structure before this is charged onto a sintering grate. The amount of lime or magnesia or both need not exceed 3% by weight of the agglomerate structure. I find that this addition reduces the loss of permeability during sintering by making the agglomerate structure more stable in the presence of moisture condensed during the sintering process. The water condensed in the unburnt material as described above reacts with the lime or magnesia and so the agglomerate structure is maintained stable.

To enable this reaction to take place the lime or magnesia must be hydratable. Because of its price and availability it is preferred to use lime, and this may be finely powdered quicklime (burnt lime) or dry hydrated (not fully slaked) lime such as is used for agricultural purposes. Magnesia may be used in the form of calcined magnesium oxide. Magnesian lime, which is in effect a mixture of lime and magnesia, may be used either in the calcined or in the dry hydrated (only partly slaked) form.

To produce strong agglomerates there must be a bonding agent in addition to moisture. Some ores as mined contain a bonding agent, e.g. clay or hydrated iron oxide, and then the desired agglomerate structure may be ensured simply by controlling the water content. The invention is, however, particularly applicable to iron-bearing materials such as ores or pyrites residues, which as a rule initially contain either no bonding agent or not enough to enable a strong agglomerate structure to be produced. Then a bonding agent, which is preferably bentonite or other clay which forms a jelly-like or colloidal suspension with water, is added to the ore or other material to be sintered. For instance such a suspension of sodium bentonite may be sprayed on to the material before or as it enters the mixer or in the initial stages of mixing.

The moisture content of the material should be adjusted so that the mixer produces agglomerates as nearly as possible of a diameter of from ⅛ to ⅜ inch. This size may be varied but it appears to be the optimum for fast sintering. As the agglomerates leave the mixer the lime or other powder is applied to it. When lime is used, there is considerable exchange of the cations in the bentonite with the calcium of the lime; as a consequence the viscosity of the bentonite agent is increased, so further strengthening the agglomerates. Reaction between some of the lime and the waste gases appears to provide additional strength by the absorption of carbon dioxide evolved from the combustion zone.

In producing the agglomerate structure, other clays may be added either as powders or in suspension, but bentonite of the type described is especially convenient as it is incorporated in the materials quickly. Colloidal or pseudo-colloidal inorganic compounds, such as sodium silicate, may be used. Organic bonding agents such as starch, dextrin and sulphite lye may also be used, but usually require more critical control of water content than clay bonding agents; in addition they may cause sticking in the chutes and conveyors of the plant.

The annexed drawing shows diagrammatically one plant in which the invention may be carried out.

In this plant the constituents to be mixed are fed from silos 1, 2 and 3 to an endless gathering belt 4. While on this belt they are sprayed with an aqueous suspension of bentonite delivered through spray nozzles 5. This suspension is distributed throughout the material by a series of ploughs 6. The material then enters a rotary mixing drum 7 having internal lifters 8.

Powdered lime is taken from a hopper 9 by a belt feeder 10 to a screw conveyor 11. This conveyor penetrates into the discharge end of the drum 7, so that the lime is sprinkled onto the agglomerates formed in the drum. The agglomerates with their superficial coatings of lime fall through openings 12 in the drum into a hopper 13, and are conveyed from it to a feed device 14 from which they are fed onto a sintering grate 15 to form a bed 16.

Concentrates are more difficult to convert into an agglomerate structure than fine ores, and the structure once formed is more easily lost. An example of the application of the invention to a material consisting largely of concentrates will now be given.

*Example 1*

The composition of the mixture to be sintered was as follows:

| | Percent |
|---|---|
| Extremely fine magnetite concentrates from Sydvaranger, Norway | 65 |
| Ore fine (—⅜ inch) screened out of iron ore | 15 |
| Returned fines (undersize sinter returned for resintering) | 20 |
| Total | 100 |

To which was added

| | Percent |
|---|---|
| Coke breeze, less than ¼ inch | 3 |
| Bentonite as aqueous suspension | 0.25 |

The moisture content of the mixture thus made was about 8%. The constituents were converted into an agglomerate structure in a rotary mixer. Dry hydrated (only partly slaked) lime in an amount equal to 1.9% by weight of the total concentrates and fines was sprinkled on to the agglomerates just as they were leaving the mixer. The agglomerate structure with a thin covering of lime on the agglomerates was then sintered in a bed 12 inches deep under an initial suction of 40 inches water gauge. Sintering was complete in 20 minutes. When an identical agglomerate structure, except that it contained no bentonite or lime, was similarly made and sintered, more than 40 minutes were required for the sintering to be complete, even though the initial suction was over 45 inches water gauge.

An example of a process in which the material consists largely of ore fines is as follows:

*Example 2*

An ore containing clay as a bonding agent was used, the materials fed to the mixer being as follows:

| | Percent |
|---|---|
| Extremely fine magnetite concentrates from Sydvaranger, Norway | 20 |
| Ore fines (—⅜ inch) screened out of clay-containing iron ore | 60 |
| Returned fines (undersize sinter returned for resintering) | 20 |
| Total | 100 |

To which was added coke breeze, less than ¼ inch, 5%. No bentonite was added.

The moisture content of the complete mixture was about 9%. Dry hydrated (only partly slaked) lime in an amount equal to 1.2% by weight of the total concentrates and fines was sprinkled on the agglomerates formed in the mixer. The sintering time for a 12 inch bed depth was 17 to 18 minutes with an initial suction of 40 inches water gauge. When no lime was added the time for sintering to be complete increased to 27 minutes.

Examples of other materials to which the invention may be applied are lead concentrates.

The invention is applicable to sintering on either fixed grates, e.g. those of the Greenawalt type, or moving grates, e.g. those of the Dwight-Lloyd type.

One advantage of the invention is that the proportion of very fine material present may be increased over that usual without detriment to the output of finished sinter.

I claim:

1. In a process of sintering a material of the kind described on a sintering grate, the steps of converting said material into agglomerates containing moisture but sufficiently devoid of free moisture at the surface so as not to be sticky, thereafter adding a small amount of at least one hydratable agent selected from the group consisting of lime and magnesia to said material, charging a mixture of a combustible substance and said material onto said grate while said agent is still in hydratable condition and said agglomerates still contain moisture, and sintering said agglomerates on the grate by passing air through said mixture, thereby establishing combustion therein, whereby water condenses on the unburnt material in a part of the grate, the water so condensed reacting with said agent and the amount of the agent being sufficient to react with the water so condensed.

2. In a process of sintering a material of the kind described on a sintering grate, the steps of mixing the constituents of said material together in a mixer and at the same time converting said material into agglomerates containing moisture but sufficiently devoid of free moisture at the surface so as not to be sticky, adding to said material in said mixer and close to the point of discharge thereof a small amount of at least one hydratable agent selected from the group consisting of lime and magnesia to said material, charging a mixture of a combustible substance and said material onto said grate while said agent is still in hydratable condition and said agglomerates still contain moisture, and sintering said agglomerates on the grate by passing air through said mixture, thereby establishing combustion therein, whereby water condenses on the unburnt material in a part of the grate, the water so condensed reacting with said agent and the amount of the agent being sufficient to react with the water so condensed.

3. In a process of sintering a material of the kind described on a sintering grate, the steps of adding a bonding agent to the constituents of said material, converting said material into agglomerates containing moisture but sufficiently devoid of free moisture at the surface so as not to be sticky, thereafter adding a small amount of at least one hydratable agent selected from the group consisting of lime and magnesia to said material, charging a mixture of a combustible substance and said material onto said grate while said agent is still in hydratable condition and said agglomerates still contain moisture, and sintering said agglomerates on the grate by passing air through said mixture, thereby establishing combustion therein, whereby water condenses on the unburnt material in a part of the grate, the water so condensed reacting with said agent and the amount of the agent being sufficient to react with the water so condensed.

4. A process as claimed in claim 3 in which the bonding agent is a clay which forms a jelly-like or colloidal suspension with water.

References Cited in the file of this patent

UNITED STATES PATENTS

| | | |
|---|---|---|
| 889,563 | Wedge | June 2, 1908 |
| 1,673,891 | Stehli | June 19, 1928 |
| 2,131,006 | Dean | Sept. 20, 1938 |
| 2,134,103 | Collord | Oct. 25, 1938 |
| 2,184,078 | Hyde | Dec. 19, 1939 |
| 2,357,198 | Hooey | Aug. 29, 1944 |
| 2,543,898 | De Vaney | Mar. 6, 1951 |
| 2,690,959 | Meyer | Oct. 5, 1954 |
| 2,806,776 | Veale et al. | Sept. 17, 1957 |
| 2,806,777 | Veale et al. | Sept. 17, 1957 |
| 2,807,534 | Haley et al. | Sept. 24, 1957 |

OTHER REFERENCES

Hackh's Chemical Dictionary, 3rd ed., published 1953 by the Blakiston Co., Inc., N.Y., p. 492.